W. H. ROWLING.
RESILIENT TIRE.
APPLICATION FILED MAY 19, 1908.

939,638.

Patented Nov. 9, 1909.

Witnesses

Inventor
W. H. Rowling,
By
Attorneys

UNITED STATES PATENT OFFICE.

WILLIAM H. ROWLING, OF SALINAS, CALIFORNIA.

RESILIENT TIRE.

939,638.                Specification of Letters Patent.      Patented Nov. 9, 1909.

Application filed May 19, 1908. Serial No. 433,758.

*To all whom it may concern:*

Be it known that I, WILLIAM H. ROWLING, a citizen of the United States, residing at Salinas, State of California, have invented certain new and useful Improvements in Resilient Tires, of which the following is a specification.

This invention contemplates certain new and useful improvements in vehicle wheels, and the object of the invention is an improved tire that may be readily applied to either an old or new wheel of the ordinary type, and that has a maximum resiliency and is thus adapted to serve as, or supplement the work of a shock absorber, and that is not subject to puncture which is one of the primary disadvantages of resilient tires of the pneumatic type.

With this and other objects in view that will more fully appear as the description proceeds, the invention consists in certain constructions and arrangements of the parts that I shall hereinafter fully describe, and then point out the novel features thereof, in the appended claims.

Figure 1:
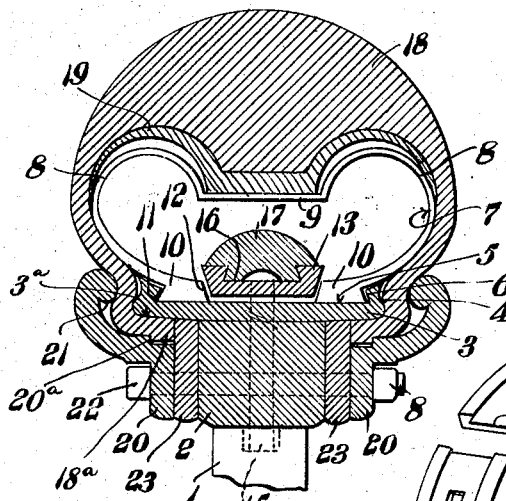
Figure 2:
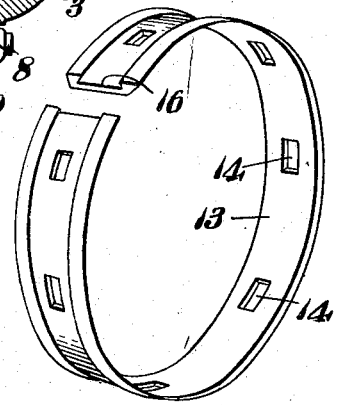
Figure 3:
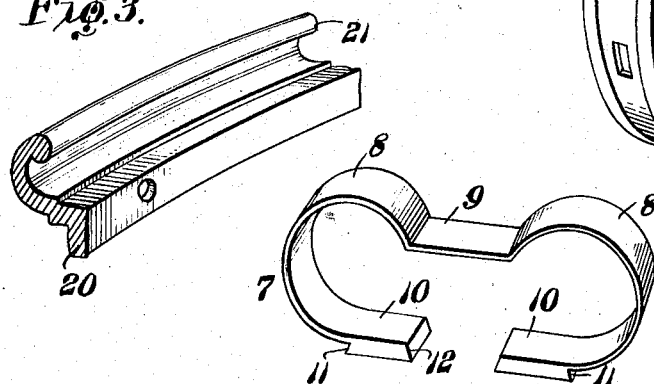
Figure 4:
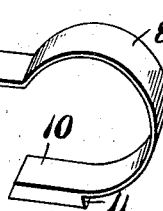
Figure 5:
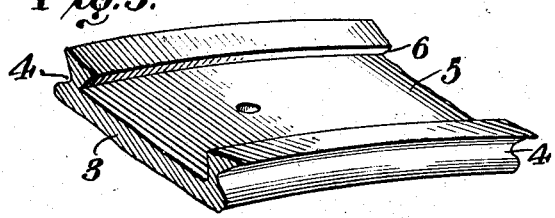
Figure 6:
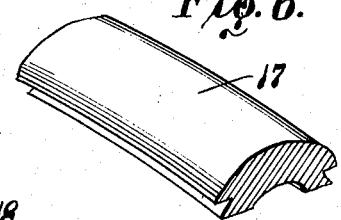
Figure 7:
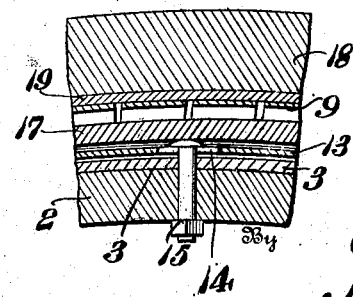

For a full understanding of the invention and the merits thereof, and to acquire a knowledge of the details of construction, reference is to be had to the following description and accompanying drawing, in which:

Figure 1 is a transverse section of my improved tire, showing it applied; Figs. 2, 3, 4, 5 and 6 are detail views in perspective, of the various parts of the tire; and, Fig. 7 is a longitudinal section partly broken away.

Corresponding and like parts are referred to in the following description and indicated in all the views of the drawing, by the same reference characters.

Referring to the drawing, the numeral 1 designates a vehicle wheel of the ordinary construction, the felly 2 of which is encircled by a retaining ring 3 that projects laterally beyond the sides of the felly and has the inner surface of its projecting portions preferably flared outwardly, as shown. This retaining ring is formed in each of its side edges with an annular groove 4, and in its periphery with an annular recess 5, the walls of the latter being under-cut, as indicated at 6. A series of transverse springs 7 are secured to the retaining ring, with their inner portions against each other, and extend radially therefrom, with their outer portions slightly spaced, so as to permit the free action of the respective springs and prevent any frictional contact during the vibration thereof. Each of these springs is of integral structure and comprises two lobes 8 which are connected at their outer ends by a cross bar 9, and the other ends of which are thickened, as shown, to form heads 10 that are received in the recess 5 in the retaining ring, and have their opposite edges 11 beveled and arranged for engagement with the under-cut walls 6 of the recess, the opposing edges 12 of said heads being transversely spaced and beveled, as shown.

In order to secure the springs 7 to the retaining ring, a locking ring 13 encircles the latter and is arranged to be received in the recess 5 thereof, said locking ring being in the form of a split band, and being wedge-shaped in cross section, so as to bear against the opposing edges 12 of the heads 10, and spread the latter apart to effectually hold the opposite edges 11 thereof in engagement with the under-cut walls 6. This locking ring is formed with a circumferential series of openings 14, and a plurality of bolts 15 pass through the respective openings and through the retaining ring 3 and the felly 2, so as to secure the locking ring in position and permit it to be conveniently drawn inwardly to effect the locking of the heads of the springs in the recess 5, the openings 14 being sufficiently elongated to permit the play of the bolts as the locking ring is drawn into position. The locking ring is formed in its periphery with an annular recess 16, the walls of which are preferably under-cut, and an endless rubber bumper 17 encircles the locking ring and is engaged in the recess 16 thereof, so as to be securely held in position, said bumper being spaced from the cross bars of the springs and forming a resilient abutment therefor when they yield inwardly under tension.

A tread 18 of suitable resilient material or substance, such as rubber, fits around and incases the springs 7, and is provided at its inner surface with a facing 19 of leather or the like, which constitutes a wearing surface to protect the tread from abrasive contact with the springs. This facing rests upon, and is supported by the cross bars 9 of the springs, and the tread is so shaped that the facing is spaced from the outer portions of the lobes, as shown, whereby to relieve the springs of tension at these points, so that they can yield freely to permit the vibration of the cross bars which obviously support all the weight. The ends of the tread portion are clenched in position by two rim sections 20 which extend along the opposite sides of the felly, and the outer portions of which are oppositely and laterally offset, and are formed with beads 21 that are arranged to bear against the ends of the tread to force the latter in the grooves 4 in the respective edges of the retaining ring, said rim sections also holding the extremities of the tread against the inner surface of the projecting portions of the retaining ring, and thus effecting a tight joint, and rendering the tire dust and moisture proof. The rim sections 20 are held in position by a plurality of bolts 22 that pass therethrough and through the felly 2 of the wheel, and are arranged to draw said rim sections together to effect the fastening of the tread, bushing rings 23 being preferably interposed between the rim sections and the corresponding sides of the felly and being of any suitable material that will compress under tension, and thus render the device applicable to wheels having fellies of different widths.

From the above description, in connection with the accompanying drawing, it will be apparent that I have provided a simple, durable and efficient construction of tire which has a maximum resiliency, and will thus serve as an effectual shock absorber, which may be easily and cheaply manufactured and which consists of comparatively few parts that may be readily assembled.

It will be noted that by the peculiar shape of the springs, the tread is retained in position against any lateral displacement, and is held in distended condition, the shape of the springs also permitting the vibration to be absorbed inwardly, thereby eliminating the spreading of the tire, which is obviously objectionable.

By reference to Fig. 1, it will be seen that the side edges of the tread 18 are formed with beads 18ª which fit in grooves 20ª in the rim sections 20. The inner face of the retaining ring 3, where it abuts against the tread portion to clench it, is made slanting, as indicated at 3ª. By this means, a perfectly tight joint is effected.

Having thus described the invention, what I claim is:

1. The combination with a vehicle wheel and the felly thereof, of a tire comprising a retaining ring encircling the felly and formed in its periphery with an annular recess having under-cut walls, a series of transverse springs formed at their ends with heads fitting in the recess and arranged for engagement with the under-cut walls thereof, a locking ring encircling the retaining ring and interposed between the heads of the springs, said locking ring being in the form of a split band and being formed with a circumferential series of openings, bolts passing through the respective openings and the retaining ring and the felly, and arranged to draw said locking ring inwardly, whereby to hold the heads in engagement with the under-cut walls of the recess, and a tread incasing the springs.

2. The combination with a vehicle wheel and the felly thereof, of a tire comprising a retaining ring encircling the felly and formed in its periphery with an annular recess having under-cut walls, a series of transverse springs formed at their ends with heads fitting in the recess and arranged for engagement with the under-cut walls thereof, a locking ring encircling the retaining ring and interposed between the heads of the springs, said locking ring being in the form of a split band and being formed with a circumferential series of openings, bolts passing through the respective openings and the retaining ring and the felly, and arranged to draw said locking ring inwardly, whereby to hold the heads in engagement with the under-cut walls of the recess, said openings being elongated to permit the play of the bolts upon the inward movement of the locking ring, and a tread incasing the springs.

3. The combination with a vehicle wheel and the felly thereof, of a tire comprising a retaining ring encircling the felly, a series of transverse springs formed at their ends with transversely spaced heads arranged for engagement with the retaining ring, a locking ring encircling the retaining ring and holding the heads in engagement therewith, said locking ring being formed in its periphery with an annular groove, a resilient bumper encircling the locking ring and received in the groove, and a tread incasing the springs.

4. The combination with a vehicle wheel and the felly thereof, of a tire comprising a retaining ring encircling the felly, a series of transverse springs formed at their ends with transversely spaced heads arranged for engagement with the retaining ring, a locking ring encircling the retaining ring and interposed between the spaced heads of the springs, to hold the same in such engagement, said locking ring being formed in its periphery with an annular groove having under-cut walls, and a resilient bumper encircling the locking ring and engaged with the under-cut walls of the groove, as and for the purpose specified.

In testimony whereof I affix my signature in presence of two witnesses.

WILLIAM H. ROWLING. [L.S.]

Witnesses:
 D. R. McKINNON, Jr.,
 GEO. A. ROWLING.